US007870300B2

(12) United States Patent
Helman et al.

(10) Patent No.: US 7,870,300 B2
(45) Date of Patent: Jan. 11, 2011

(54) REMOTE MANAGEMENT OF STORAGE CONTROLLERS (75) Inventors: Haim Helman, Herzliya (IL); Omri Palmon, Tel Aviv (IL); Shemer Schwarz, Tel-Aviv (IL); Kanael Arditti, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 12/192,221

(22) Filed: Aug. 15, 2008

(65) Prior Publication Data
US 2010/0042752 A1 Feb. 18, 2010

(51) Int. Cl.
*G06F 3/00* (2006.01)
(52) U.S. Cl. .............................. 710/5; 710/8
(58) Field of Classification Search ...... 710/5, 710/8
See application file for complete search history.

(56) References Cited

U.S. PATENT DOCUMENTS

| 7,165,258 | B1 | 1/2007 | Kuik et al. |
| 7,281,062 | B1 | 10/2007 | Kuik et al. |
| 7,363,351 | B1 | 4/2008 | Shafer |
| 2001/0049774 | A1 | 12/2001 | Otterness et al. |
| 2003/0061399 | A1 | 3/2003 | Wagener et al. |
| 2003/0105840 | A1 | 6/2003 | Mandal et al. |
| 2004/0010680 | A1 | 1/2004 | Smith et al. |
| 2006/0010502 | A1 | 1/2006 | Mimatsu et al. |
| 2007/0022218 | A1* | 1/2007 | Szolyga et al. ............... 709/250 |
| 2008/0005514 | A1* | 1/2008 | Kurokawa et al. ........... 711/163 |
| 2008/0091899 | A1* | 4/2008 | Innan et al. .................. 711/162 |
| 2008/0162767 | A1* | 7/2008 | Cho et al. .................... 710/305 |
| 2008/0201551 | A1* | 8/2008 | Zhang et al. ................. 711/203 |
| 2009/0037924 | A1* | 2/2009 | Zohar et al. .................. 718/105 |

FOREIGN PATENT DOCUMENTS

| EP | 1067732 | 1/2001 |
| WO | WO-2007037965 | 4/2007 |

OTHER PUBLICATIONS

International Search Report mailed Sep. 8, 2009 received in corresponding International Application No. PCT/EP2009/058198.

* cited by examiner

*Primary Examiner*—Alford W Kindred
*Assistant Examiner*—David E Martinez
(74) *Attorney, Agent, or Firm*—Griffiths & Seaton PLLC (57) ABSTRACT

A method for data storage includes accepting a management command by a first storage controller, which exchanges data for storage with at least a second storage controller over a dedicated communication connection using a dedicated storage protocol. The management command is addressed to a destination storage controller and contains an instruction to modify or report a data storage configuration in the destination storage controller. Upon determining that the destination storage controller is different from the first storage controller, the management command is forwarded over the dedicated communication connection from the first storage controller to the second storage controller using the dedicated storage protocol.

25 Claims, 3 Drawing Sheets

FIG. 1

FIG. 2

REMOTE MANAGEMENT OF STORAGE CONTROLLERS

FIELD OF THE INVENTION

This invention relates generally to data storage, and specifically to methods and apparatus for management of remote storage devices.

BACKGROUND

Diverse methods and apparatus for storing data are known in the art. Some storage systems employ multiple interconnected storage controllers for storing data. There are a number of reasons to employ multiple storage controllers, such as for replicating (mirroring) data between multiple physical locations or for handling large storage throughputs that are beyond the capabilities of a single storage controller. Data replication may be used in data storage systems to ensure consistency between redundant resources, such as storage devices. Data storage systems may replicate data to provide fault-tolerance, reliability, or accessibility. Data storage replication may be implemented by distributing updates to storage devices across a data network or other connection, such as a dedicated communication line. Management of remote storage devices often involves sending requests for operational information and receiving replies to the requests.

BRIEF SUMMARY

An embodiment of the present invention provides a method for data storage. The method includes accepting a management command by a first storage controller, which exchanges data for storage with at least a second storage controller over a dedicated communication connection using a dedicated storage protocol. The management command is addressed to a destination storage controller and contains an instruction to modify a data storage configuration in the destination storage controller. Upon determining that the destination storage controller is different from the first storage controller, the management command is forwarded over the dedicated communication connection from the first storage controller to the second storage controller using the dedicated storage protocol.

In some embodiments, accepting the management command includes accepting the management command from a management station. The management station may include a standalone computer. Alternatively, the management station may be included in a host computer connected to the first storage controller. In an embodiment, the management command is accepted from a storage controller.

In a disclosed embodiment, the management command includes a first identifier specifying the destination storage controller, and determining that the destination storage controller is different than the first storage controller includes extracting the first identifier from the management command and comparing the first identifier with a second identifier of the first storage controller.

In an embodiment, the first and second identifiers include World Wide Node Names (WWNN). In another embodiment, forwarding the management command includes encapsulating the management command so as to produce a command conforming to the dedicated storage protocol. In some embodiments, the command conforming to the dedicated storage protocol is decapsulated by the destination storage controller, so as to extract the management command. In another embodiment, the management command is executed by the destination storage controller. In yet another embodiment, forwarding the management command over the dedicated communication connection includes communicating with the second storage controller over a Storage Area Network (SAN). In still another embodiment, forwarding the management command over the dedicated communication connection includes communicating with the second storage controller over a Network-Attached Storage (NAS) configuration.

In an embodiment, the management command includes one or more first sub-commands for execution by the first storage controller and one or more second sub-commands for execution by the second storage controller, and the method includes executing the first sub-commands by the first storage controller and executing the second sub-commands by the second storage controller.

There is additionally provided, in accordance with an embodiment of the present invention, another method for data storage. The method includes accepting a management command by a first storage controller, which exchanges data for storage with at least a second storage controller over a dedicated communication connection using a dedicated storage protocol. The management command is addressed to a destination storage controller and contains an instruction to report a data storage configuration in the destination storage controller. Upon determining that the destination storage controller is different from the first storage controller, the management command is transmitted over the dedicated communication connection from the first storage controller to the second storage controller using the dedicated storage protocol.

A storage controller and a computer software product for data storage are also provided.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

Overview

In some storage systems, one or more storage controllers store data in storage devices. The storage controllers receive commands from one or more hosts to write or read the data. Two or more storage controllers may be used to provide data replication (mirroring) between multiple data storage sites, or to provide other data storage functionality known in the art. In mirroring applications (which are typically used for disaster recovery), the multiple storage controllers are usually located remotely from each other, although the controllers may reside at the same physical location.

In a typical system configuration, the storage controllers are connected to one another using a dedicated communication connection. The storage controllers communicate over this connection using a dedicated storage protocol, such as the Small Computer System Interface (SCSI) or Fibre-Channel (FC). In many storage system configurations, a management station is connected locally to a given storage controller to enable an operator to submit management commands to manage stored data.

Embodiments of the present invention provide improved methods and systems for managing storage controllers. The methods and systems described herein enable an operator to control and manage one storage controller using a management station that is connected locally to another storage controller, by exploiting the dedicated communication connection between the storage controllers and the dedicated storage protocol used for data storage. In the description that follows, the storage controller that is connected locally to the management station is referred to as the local storage controller. The storage controller to which the management command is addressed is referred to as the destination storage controller.

In some embodiments that are described herein, the operator submits a management command, which is addressed to a destination storage controller that is different from the local storage controller. The management command comprises an instruction to modify or report the data storage configuration of the destination storage controller. One example embodiment is when the operator submits an instruction to create a volume on a remote storage device that is managed by a remote storage controller. In this example, the operator is connected via the management station to the local storage controller and commands the remote storage controller to create the volume on the remote storage device. Additional examples of management commands are given further below.

Upon receiving the command, the local storage controller determines the identity of the storage controller to which the command is addressed. If the command is addressed to the local storage controller, the local storage controller executes the command. Otherwise, the local storage controller sends the command to the remote storage controller over the dedicated communication connection using the dedicated storage protocol.

The methods and systems described herein enable an operator to control and manage any storage controller in the system from a single management station, without a need to be connected locally to the managed storage controller. Thus, the disclosed methods and systems improve the management capabilities of the operator considerably. This feature is especially advantageous in remote mirroring applications, in which the storage controllers are typically distant from one another. Moreover, the methods and systems described herein improve data security, since the storage controllers are managed using the same connections and protocols used for data storage, without a need for external networks or connections.

System Description

Figure 1:
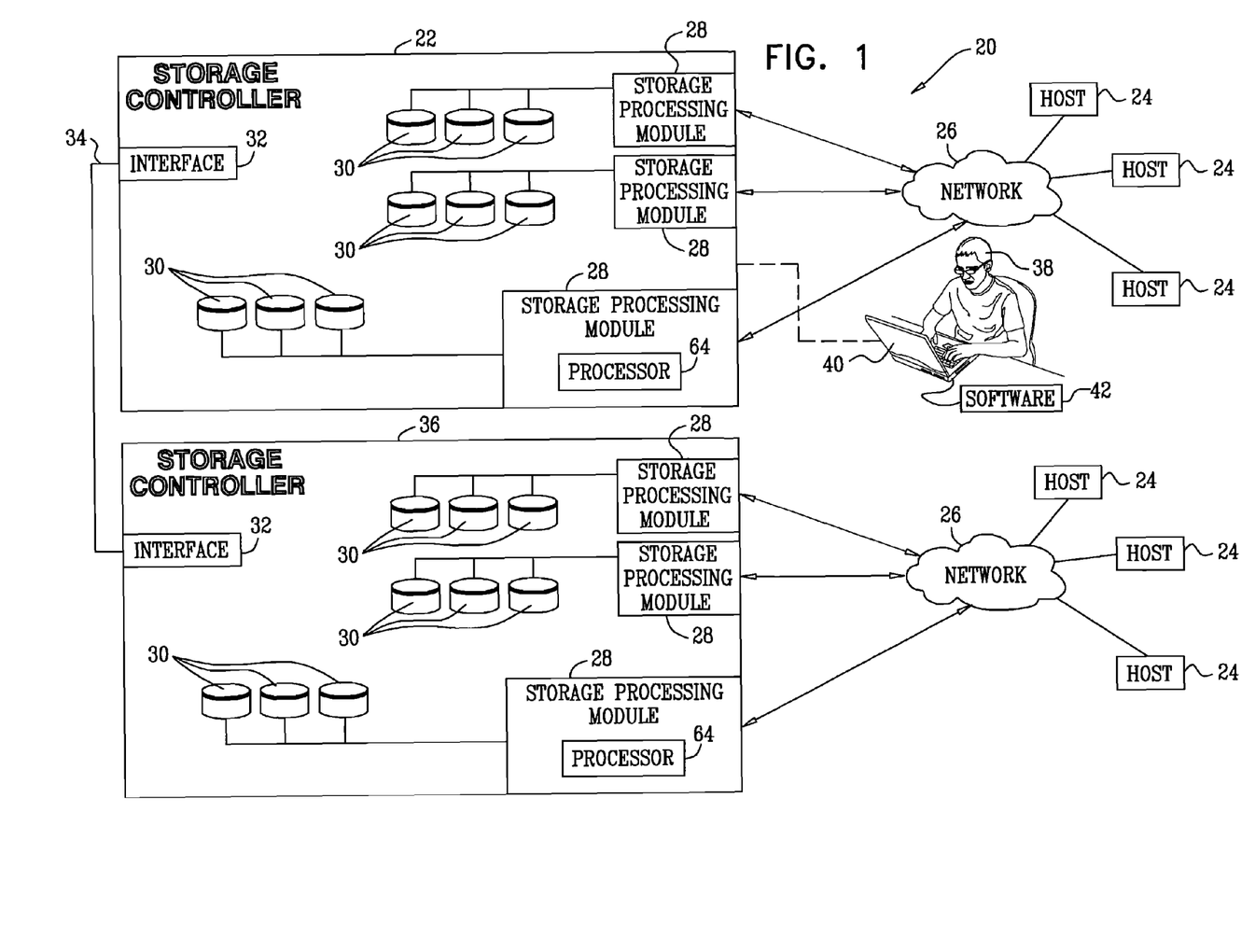
FIG. 1 is a block diagram that schematically illustrates a data storage system, in accordance with an embodiment of the present invention.

Reference is now made to FIG. 1, which is a block diagram that schematically illustrates a data storage system 20, in accordance with an embodiment of the present invention. System 20 comprises a storage controller 22, which stores and retrieves data for hosts 24. System 20 may comprise multiple storage controllers, either in a single location or distributed across multiple locations. By way of example, system 20 also comprises another storage controller 36, which is substantially similar to storage controller 22, and is located in a separate location from storage controller 22. The multiple storage controllers may be connected using any suitable topology known in the art. Some example topologies include "Point-to-Point," "Star," "Arbitrated Loop" and "Switched fabric."

The multiple storage controllers are connected by a dedicated communication connection 34 and communicate with each other using a dedicated storage protocol. In the context of the present patent application and in the claims, the term "dedicated communication connection" refers to any communication connection that is used to exchange data for storage and retrieval between the storage controllers. For example, the connection may comprise a telecommunications line, typically symmetrical, which connects two or more locations dedicated to a specific application or set of applications. Typically although not necessarily, the connection may provide guarantees of bandwidth availability and/or near-constant latency, or other benefits well-known in the art. The dedicated communication connection may comprise a communication cable, a leased line, a virtual connection established over a public or private, packet-switched or circuit-switched network, or any other suitable means of providing dedicated communication between at least two storage controllers.

In the context of the present patent application and in the claims, the term "dedicated Storage protocol" refers to any suitable standard that is known in the art for transferring data for storage and/or data retrieved from storage between storage devices. Such standards typically define commands, protocols, and electrical or optical interfaces. Some examples of dedicated storage protocols comprise Small Computer System Interface (SCSI), internet SCSI (iSCSI) and Fibre-Channel (FC).

In the example embodiment of FIG. 1, connection 34 comprises a leased line that connects storage controllers 22 and 36. Herein, by way of example, controller 22 communicates via connection 34 with controller 36 using the SCSI communication protocol.

In the configuration of FIG. 1, hosts 24 are typically coupled to system 20 via a network 26, such as a wide area network (WAN) or a Storage Area Network (SAN), although any other form of coupling, such as Network-Attached Storage (NAS) or a direct coupling from one or more hosts to the system (often referred to as Direct Attached Storage—DAS) may be used. The form of coupling may comprise wired, fiber optic or other guided wave carrier, or wireless coupling. In the example of FIG. 1, the system comprises two networks 26 that respectively connect the two storage controllers to the hosts. Each network 26 may be protected by a firewall (not shown). The two networks 26 may be distant from one another, such as in different cities.

Each of the storage controllers comprises multiple storage processing modules 28, which store data in multiple storage devices, such as disks 30. Each storage controller may comprise any desired number of modules 28 and any desired number of disks 30. Each of modules 28 typically comprises a network interface (not shown) and a processor 64. The network interface communicates with network 26. In particular, the network interface accepts input/output (I/O) commands (e.g., read and write commands) from hosts 24 and forwards the commands to other elements of the storage controller. Processor 64 of a given module 28 relays management commands to other storage controllers, as will be explained in detail further below. Each storage controller also comprises an interface 32, which communicates with other storage controllers via connection 34, using any suitable dedicated storage protocol, such as the SCSI or Fibre-Channel (FC) protocols, as described hereinabove.

An operator 38 typically uses a management station 40, connected to storage controller 22, to operate system 20 using system operation software 42. Software 42 typically provides a suitable Graphical User Interface (GUI) and/or Command Line Interface (CLI) for use by operator 38. Software 42 comprises functions that enable station 40 to submit management commands to storage controller 22 or to other storage controllers (e.g., storage controller 36), as described hereinbelow. Thus, controllers 22 and 36 are referred to herein as a local storage controller and a remote storage controller, respectively.

In the context of the present patent application and in the claims, the term "management command" refers to any request that is submitted to a storage controller, requesting the storage controller to perform a management operation. Management operations do not store or retrieve data directly, but are related to the configuration of data storage or of the storage controller. Typically, a management command requests that the storage controller either modify or report its storage configuration.

Operator 38 uses management station 40 to send management commands to storage controller 22 and/or to storage controller 36. Processor 64 of the local storage controller processes the management commands accepted from station 40 using methods that are explained below. The management commands typically comprise instructions to modify or report the data storage configuration of the storage controller in question.

The system configuration of FIG. 1 is an exemplary configuration, which is chosen purely for the sake of conceptual clarity. As noted above, system 20 may comprise any desired number of storage controllers that are connected to one another in any desired configuration.

Management Commands

Figure 2:
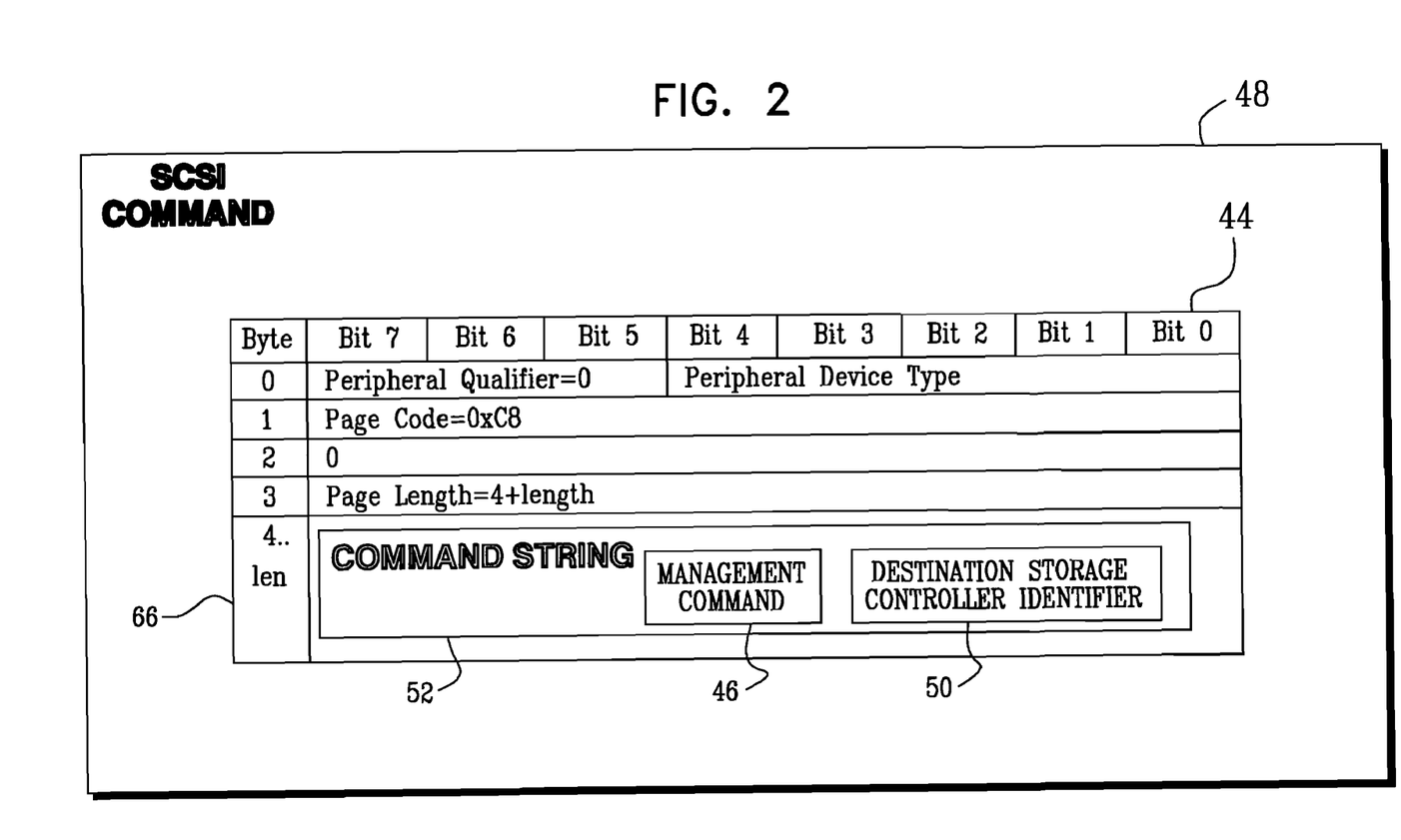
FIG. 2 is a block diagram that schematically illustrates a management command for managing a storage controller, in accordance with an embodiment of the present invention.

Reference is now made to FIG. 2, which is a block diagram that schematically illustrates a command descriptor block 44 of a management command 46 for managing a storage controller, in accordance with an embodiment of the present invention. Herein, by way of example, system 20 is assumed to use SCSI as the dedicated storage protocol. SCSI is described, for example, in "Project Proposal for SCSI Primary Commands-3 (SPC-3)," Nov. 4, 1999. This document is promulgated by Technical Committee T10 of the InterNational Committee on Information Technology Standards (INCITS), and may be obtained from the T10 web site, t10.org. Station 40 may send management commands to controller 22 using any suitable standard or proprietary protocol. In some embodiments of the present invention, controller 22 receives management command 46 shown in FIG. 2 from station 40. In these embodiments, station 40 and controller 22 may communicate using SCSI, or using any other suitable protocol.

In some example embodiments, station 40 is implemented as an application running on one of hosts 24 rather than as a standalone management computer. The host in which the functionality of station 40 is embodied may be connected to the storage controllers using SCSI. In these embodiments, station 40 encapsulates management command 46. Typically, processor 64 encapsulates management command 46 submitted by operator 38 in command descriptor block 44 of a SCSI command 48. Command descriptor block 44 typically comprises a one-byte operation code followed by some command-specific parameters. Command-specific parameters of command descriptor block 44 may also comprise vendor-specific parameters.

Processor 64 prepares SCSI command 48 to be submitted to storage controller 22 by defining a command string 52 and by populating command descriptor block 44 with other data required for command submission, for example the operation code of command descriptor block 44. Processor 64 populates other fields in command descriptor block 44 using standard SCSI protocol information.

Processor 64 inserts management command 46 and a destination storage controller identifier 50 within command string 52, and inserts command string 52 into a predetermined vendor-specific parameter of SCSI command 48. Identifier 50 specifies the destination storage controller to which the management command is addressed (in the present example, either local controller 22 or remote controller 36). Command string 52 may be formatted as a CLI string, as an extensible Markup Language (XML) string, or may be formatted using any command format known in the art.

In an example embodiment of the present invention, processor 64 inserts command string 52 within command descriptor block 44 of a SCSI "READ MANAGEMENT (16)" command, in a vendor-specific parameter such as a vendor-allocated byte 66 of command descriptor block 44. In the present example, destination storage controller identifier 50 comprises a World Wide Node Name (WWNN), identifying destination storage controller 36. The WWNN is a unique identifier used in the dedicated storage protocol, which is SCSI in the current example. Each WWNN comprises an 8-byte number followed by vendor-supplied information. Once processor 64 has completed preparing SCSI command 48, software 42 commands processor 64 to submit SCSI command 48 to storage controller 22.

In some embodiments of the present invention, a certain storage controller may receive management command 46 from another controller, but may still need to relay the command to yet another storage controller. In these embodiments, the relaying storage controller encapsulates management command 46 as described hereinabove.

Embodiments of the present invention are not limited to the specific command structure of command descriptor block 44 or to identifiers such as destination storage controller identifier 50. Other command structures used by alternative dedicated storage protocols and other identifiers may be used to identify the storage controllers in order to encapsulate and forward management commands via the alternative dedicated storage protocols. Generally, a storage controller may use any suitable technique for formatting the management command as a command conforming to the dedicated storage protocol, in order to send it to another storage controller over the dedicated communication connection that connects them.

System 20 utilizes logical disk partitions for data storage, typically called logical volumes. The system sometimes creates copies of logical volumes, commonly known as snapshots. Some examples of management commands supported by system 20 may comprise "create volume," "delete volume," "create snapshot," "delete snapshot," "resize volume," and "list volumes." The create volume management command typically requests the storage controller to create a volume. The delete volume management command usually instructs the storage controller to delete a volume. The create snapshot management command typically requests the storage controller to create a snapshot of a specified volume. The delete snapshot management command usually causes the storage controller to delete a given snapshot. The resize volume management command typically requests the storage controller to allocate additional logical extents to a volume, or to have remove some logical extents from the volume. The list volumes management command usually requests the storage controller to report a list of the volumes defined therein.

Management Command Transmission Method Description

Figure 3:
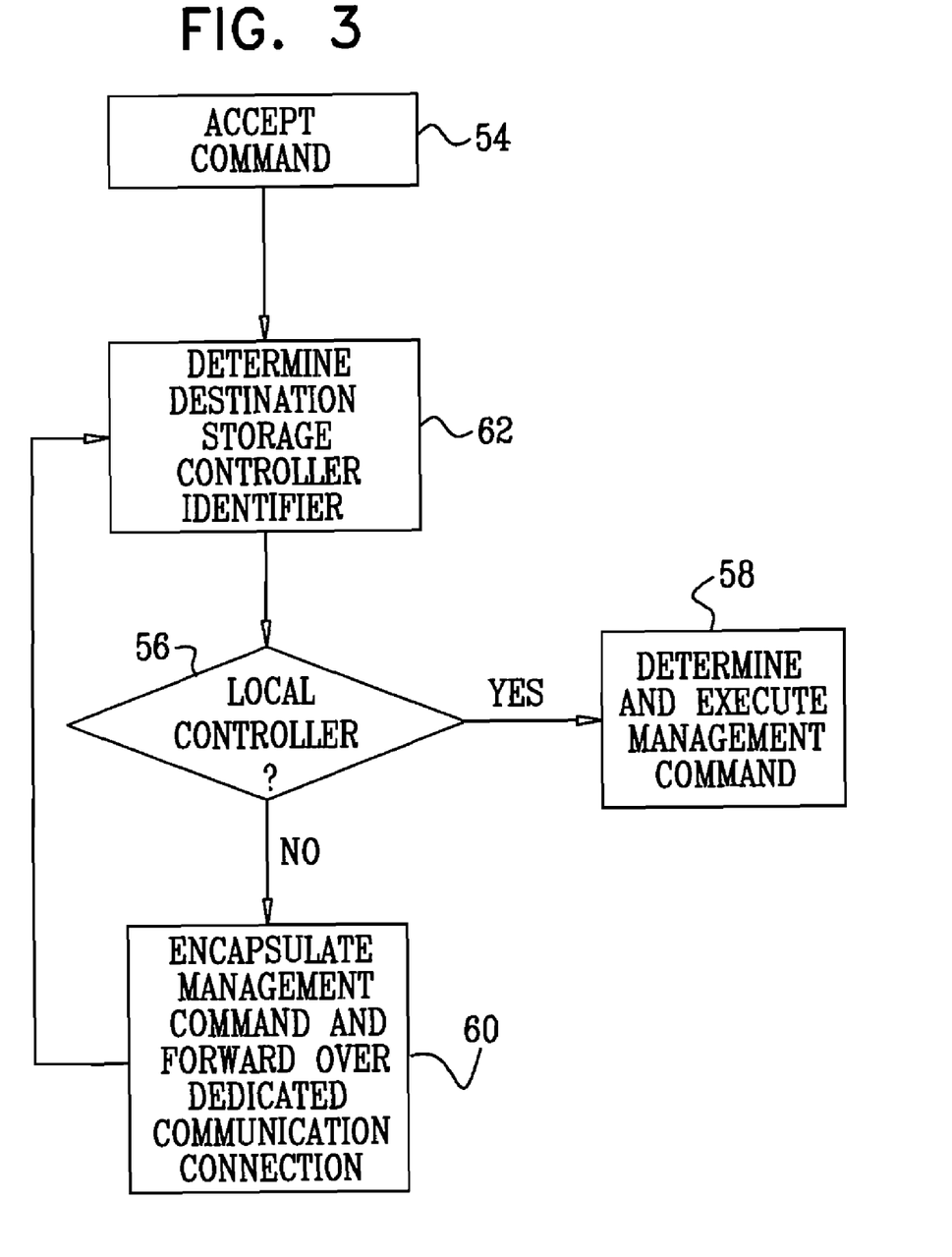
FIG. 3 is a flow chart that schematically illustrates a method for managing storage controllers, in accordance with an embodiment of the present invention.

Reference is now made to FIG. 3, which is a flow chart that schematically illustrates a method for managing storage controllers, in accordance with an embodiment of the present invention. The example of FIG. 3 describes a scenario in which the management command is to be executed exclusively by the destination storage controller. In alternative embodiments, some management commands are executed partly by the local storage controller and partly by the destination storage controller. Such commands are addressed in greater detail further below.

In a command accepting step 54, storage controller 22 (FIG. 1) accepts SCSI command 48 from station 40.

In a destination identifier determining step 62, processor 64 of storage controller 22 determines destination storage controller identifier 50 by parsing command string 52 of SCSI command 48.

In a destination controller decision step 56, processor 64 of storage controller 22 decides whether identifier 50 matches the identifier of controller 22. If processor 64 identifies controller 22 as the destination storage controller, controller 22 extracts management command 46 by parsing command string 52 of SCSI command 48, and executes management command 46, in a management command determining and executing step 58.

If, on the other hand, processor 64 decides that identifier 50 does not match the identifier of controller 22, controller 22 encapsulates management command 46 within SCSI command 48 as described hereinabove and forwards SCSI command 48 to the destination storage controller over connection 34, in a command encapsulating and forwarding step 60. The management command is thus sent to the destination storage controller over the dedicated communication connection, using the same dedicated storage protocol (SCSI) that is used by the storage controllers for data storage and retrieval.

In an example embodiment of the present invention, the management command is addressed to remote controller 36. In these embodiments, controller 22, after encapsulating management command 46 within SCSI command 48, forwards command 48 to storage controller 36. Storage controller 36 receives SCSI command 48 from controller 22 and carries out destination identifier determination step 62. In destination controller decision step 56, processor 64 of storage controller 36 decides that identifier 50 matches the identifier of storage controller 36. In management command determining and executing step 58, processor 64 of storage controller 36 extracts management command 46 from SCSI command 48, as described hereinabove, and executes management command 46.

In another example embodiment of the present invention, the management command is addressed to controller 36, but system 20 comprises intermediate storage controllers (not shown) between controller 22 and controller 36. Controller 22, after encapsulating management command 46 within SCSI command 48, forwards SCSI command 48 to an intermediate storage controller. The intermediate storage controller receives SCSI command 48 from controller 22 and performs destination identifier determination step 62. The intermediate storage controller decides that identifier 50 does not match the identifier of the intermediate storage controller. As a result, the intermediate storage controller encapsulates management command 46 within SCSI command 48, and may forward SCSI command 48 to destination storage controller 36 or to another intermediate storage controller. Using this technique, the management command is forwarded using SCSI from one storage controller to another, until it arrives at storage controller 36. Once storage controller 36 receives SCSI command 48, controller 36 performs the steps described hereinabove and executes management command 46.

In some embodiments, system 20 is connected to external networks such as internet protocol (IP) networks. However, in some storage systems it is desirable for storage controllers to limit communication to the dedicated communication connection, thus providing improved security. Since the disclosed methods enable storage controllers to forward and receive management commands with each other using the same dedicated storage protocol used for data storage, the methods and systems described herein provide the ability to manage any storage controller from any other storage controller without passing through any other external network, such as an IP network. Thus, the disclosed methods provide a high level of data security.

The storage controllers may apply various security checks, such as access control level verification, to the accepted management commands. In some embodiments, the local storage controller accepting the command performs the security checks. Alternatively, applicable security information (e.g., username and password or other credentials) is relayed to the remote storage controller with the command, and the remote storage controller (or an intermediate storage controller) performs the security checks.

In some embodiments, system 20 supports composite management commands, i.e., commands that are made of multiple sub-commands. Typically but not necessarily, the sub-commands are to be executed in a particular sequence. In some embodiments, a composite management command comprises one or more sub-commands for execution by the local storage controller and one or more other sub-commands for execution by the remote (destination) storage controller. For example, a "delete remote volume" command may comprise one sub-command requesting the local storage controller to stop the data fork, and another sub-command requesting the remote storage controller to delete the volume. In alternative embodiments, a composite management command may comprise any desired number of sub-commands, and may specify any desired division of labor between the local and remote storage controllers, and possibly intermediate storage controllers.

In some embodiments, each storage controller that processes a management command checks whether the command contains a sub-command that should be executed by that controller, and executes the sub-command if appropriate. In particular, the local storage controller executes the sub-commands addressed thereto before forwarding the composite management command to the remote storage controller.

In the preceding description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus provide processes for implementing the functions/acts specified in the flowchart and/or block diagram block or blocks.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for data storage in a storage system including a first storage controller comprising a first identifier coupled, via a dedicated communication connection using a dedicated storage protocol, to a second storage controller comprising a second identifier, the method comprising:
    accepting, by the first storage controller, a management command addressed to the second storage controller, the management command comprising:
        one or more first sub-commands for execution by the first storage controller,
        one or more second sub-commands for execution by the second storage controller,
        the second identifier as an identifier of a destination storage controller, and
        an instruction to modify a data storage configuration in the destination storage controller;
    determining, by the first storage controller, that the management command comprises the second identifier and does not include the first identifier; and
    forwarding, by the first storage controller, the management command over the dedicated communication connection from the first storage controller to the second storage controller using the dedicated storage protocol in response to determining that the second storage controller is the destination storage controller and the management command does not include the first identifier.

2. The method according to claim 1, wherein accepting the management command comprises accepting the management command from a management station.

3. The method according to claim 2, wherein the management station comprises a standalone computer.

4. The method according to claim 2, wherein the management station is comprised in a host computer connected to the first storage controller.

5. The method according to claim 1, wherein accepting the management command comprises accepting the management command from a third storage controller coupled to the first storage controller.

6. The method according to claim 1, wherein the first and second identifiers comprise World Wide Node Names (WWNN).

7. The method according to claim 1, wherein forwarding the management command comprises encapsulating the management command so as to produce a command conforming to the dedicated storage protocol.

8. The method according to claim 7, and comprising decapsulating the command conforming to the dedicated storage protocol by the second storage controller, so as to extract the management command.

9. The method according to claim 1, and comprising executing the management command by the second storage controller.

10. The method according to claim 1, wherein forwarding the management command over the dedicated communication connection comprises communicating with the second storage controller over a Storage Area Network (SAN).

11. The method according to claim 1, wherein forwarding the management command over the dedicated communication connection comprises communicating with the second storage controller over a Network-Attached Storage (NAS) configuration.

12. The method according to claim 1, wherein the management command comprises one or more first sub-commands for execution by the first storage controller and one or more second sub-commands for execution by the second storage controller, and comprising executing the first sub-commands by the first storage controller and executing the second sub-commands by the second storage controller.

13. A method for data storage in a storage system including a first storage controller comprising a first identifier coupled, via a dedicated communication connection using a dedicated storage protocol, to a second storage controller comprising a second identifier, the method comprising:
accepting, by the first storage controller, a management command addressed to the second storage controller, the management command comprising:
one or more first sub-commands for execution by the first storage controller,
one or more second sub-commands for execution by the second storage controller,
the second identifier as an identifier of a destination storage controller, and
an instruction to report a data storage configuration in the destination storage controller; and
determining, by the first storage controller, that the management command comprises the second identifier and does not include the first identifier; and
forwarding, by the first storage controller, the management command over the dedicated communication connection from the first storage controller to the second storage controller using the dedicated storage protocol in response to determining that the second storage controller is the destination storage controller and the management command does not include the first identifier.

14. A storage controller, comprising:
an interface configured to communicate with a first different storage controller over a dedicated communication connection using a dedicated storage protocol; and
a processor coupled to the interface, the processor configured to:
accept a management command addressed to the first different storage controller, the management command comprising:
one or more first sub-commands for execution by the storage controller,
one or more second sub-commands for execution by the first different storage controller,
the second identifier as an identifier of a destination storage controller and an instruction to modify a data storage configuration in the destination storage controller,
determine that the management command comprises the second identifier and does not include the first identifier, and
forward the management command over the dedicated communication connection from the storage controller to the other storage controller using the dedicated storage protocol in response to determining that the first different storage controller is the destination storage controller and the management command does not include the first identifier.

15. The storage controller according to claim 14, wherein the processor is configured to accept the management command from a management station.

16. The storage controller according to claim 15, wherein the management station comprises a standalone computer.

17. The storage controller according to claim 15, wherein the management station is comprised in a host computer connected to the interface.

18. The storage controller according to claim 14, wherein the processor is configured to accept the management command from a second different storage controller.

19. The storage controller according to claim 14, wherein the first and second identifiers comprise World Wide Node Names (WWNN).

20. The storage controller according to claim 14, wherein the processor is configured to encapsulate the management command so as to produce a command conforming to the dedicated storage protocol.

21. The storage controller according to claim 14, wherein the interface is coupled to communicate with the first different storage controller over a Storage Area Network (SAN).

22. A storage controller, comprising:
an interface configured to communicate with a first different storage controller over a dedicated communication connection using a dedicated storage protocol; and
a processor coupled to the interface, the processor configured to:
accept a management command addressed to the first different storage controller, the management command comprising:
one or more first sub-commands for execution by the storage controller,
one or more second sub-commands for execution by the first different storage controller,
the second identifier as an identifier of a destination storage controller and an instruction to report a data storage configuration in the destination storage controller,
determine that the management command comprises the second identifier and does not include the first identifier, and
forward the management command over the dedicated communication connection from the storage controller to the first different storage controller using the dedicated storage protocol in response to determining that the first different storage controller is the destination storage controller and the management command does not include the first identifier.

23. A computer software product for data storage, the product comprising a computer-readable medium in which program instructions are stored, which instructions, when executed by a first storage controller, which exchanges data for storage with a second storage controller over a dedicated communication connection using a dedicated storage protocol, cause the first storage controller to:
  accept a management command addressed to the second storage controller, the management command comprising:
    one or more first sub-commands for execution by the first storage controller,
    one or more second sub-commands for execution by the second storage controller,
    the second identifier as an identifier of a destination storage controller, and
    an instruction to modify a data storage configuration in the destination storage controller;
  determine that the management command comprises the second identifier and does not include the first identifier; and
  forward the management command over the dedicated communication connection from the first storage controller to the second storage controller using the dedicated storage protocol in response to determining that the second storage controller is the destination storage controller and the management command does not include the first identifier.

24. The storage controller according to claim 22, wherein the processor is configured to accept the management command from a second different storage controller.

25. The storage controller according to claim 22, wherein the processor is configured to encapsulate the management command so as to produce a command conforming to the dedicated storage protocol.

* * * * *